United States Patent
Yoo et al.

(10) Patent No.: US 12,355,090 B2
(45) Date of Patent: Jul. 8, 2025

(54) BATTERY MODULE INCLUDING BASE PLATE HAVING GAS DISCHARGE PASSAGE, AND BATTERY PACK AND ENERGY STORAGE SYSTEM INCLUDING THE SAME

(71) Applicant: LG ENERGY SOLUTION, LTD., Seoul (KR)

(72) Inventors: Jae-Min Yoo, Daejeon (KR); Jeong-O Mun, Daejeon (KR); Eun-Gyu Shin, Daejeon (KR); Yoon-Koo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/668,963

(22) Filed: May 20, 2024

(65) Prior Publication Data

US 2024/0304919 A1    Sep. 12, 2024

Related U.S. Application Data (63) Continuation of application No. 17/294,562, filed as application No. PCT/KR2020/006862 on May 27, 2020, now Pat. No. 12,015,165.

(30) Foreign Application Priority Data

Jun. 17, 2019 (KR) .......................... 10-2019-0071733

(51) Int. Cl.
*H01M 50/24* (2021.01)
*H01M 10/613* (2014.01)
(Continued)

(52) U.S. Cl.
CPC .......... *H01M 50/24* (2021.01); *H01M 10/613* (2015.04); *H01M 10/647* (2015.04);
(Continued)

(58) Field of Classification Search
None
See application file for complete search history.

(56) References Cited

U.S. PATENT DOCUMENTS

| 4,374,187 A * | 2/1983 | Sano ................... H01M 50/383 429/88 |
| 2012/0094156 A1 * | 4/2012 | Lim ...................... H01M 50/30 429/82 |

(Continued)

FOREIGN PATENT DOCUMENTS

| EP | 2 738 834 A1 | 6/2014 |
| EP | 3 091 604 A1 | 11/2016 |

(Continued)

OTHER PUBLICATIONS

Extended European Search Report for European Application No. 20827582.6, dated Jun. 29, 2022.

(Continued)

*Primary Examiner* — Eli S Mekhlin
(74) *Attorney, Agent, or Firm* — Birch, Stewart, Kolasch & Birch, LLP (57) ABSTRACT

A battery module including a base plate, a front cover at a first end of the base plate and a rear cover at a second end of the base plate, the rear cover spaced from the front cover in a first direction, a pair of gas discharge passages extending in the first direction, an outlet in the rear cover for each of the pair of gas discharge passages, and a mesh cover over each outlet, wherein each of the pair of gas discharge passages has an open portion formed by a top of the gas discharge passage.

11 Claims, 5 Drawing Sheets

(51) Int. Cl.
    *H01M 10/647* (2014.01)
    *H01M 10/653* (2014.01)
    *H01M 10/6556* (2014.01)
    *H01M 10/6567* (2014.01)
    *H01M 50/211* (2021.01)
    *H01M 50/244* (2021.01)
    *H01M 50/264* (2021.01)
    *H01M 50/271* (2021.01)
    *H01M 50/289* (2021.01)
    *H01M 50/35* (2021.01)
    *H01M 50/502* (2021.01)
    *H01M 50/627* (2021.01)

(52) U.S. Cl.
    CPC ..... *H01M 10/653* (2015.04); *H01M 10/6556* (2015.04); *H01M 10/6567* (2015.04); *H01M 50/211* (2021.01); *H01M 50/244* (2021.01); *H01M 50/264* (2021.01); *H01M 50/271* (2021.01); *H01M 50/289* (2021.01); *H01M 50/35* (2021.01); *H01M 50/502* (2021.01); *H01M 50/627* (2021.01)

(56) References Cited

U.S. PATENT DOCUMENTS

| | | | |
|---|---|---|---|
| 2013/0071706 A1* | 3/2013 | Lee | H01M 10/486 429/62 |
| 2015/0140388 A1* | 5/2015 | Harada | H01M 10/6556 429/120 |
| 2016/0093842 A1 | 3/2016 | Blanco et al. | |
| 2017/0033419 A1 | 2/2017 | Eom et al. | |
| 2018/0358593 A1 | 12/2018 | Seo et al. | |
| 2019/0140229 A1 | 5/2019 | Lindstrom et al. | |
| 2019/0296294 A1 | 9/2019 | Hirschbeck et al. | |
| 2021/0036279 A1 | 2/2021 | Tada et al. | |
| 2021/0104801 A1 | 4/2021 | Chu et al. | |

FOREIGN PATENT DOCUMENTS

| | | |
|---|---|---|
| EP | 3 660 975 A1 | 6/2020 |
| JP | 2013-243079 A | 12/2013 |
| JP | 2013-246990 A | 12/2013 |
| JP | 2014-241245 A | 12/2014 |
| JP | WO2013/018283 A1 | 3/2015 |
| JP | WO2013/171885 A1 | 1/2016 |
| JP | 2018-206604 A | 12/2018 |
| JP | 2019-516229 A | 6/2019 |
| KR | 0153364 B1 | 6/1997 |
| KR | 10-2015-0118375 A | 10/2015 |
| KR | 10-2017-0012482 A | 2/2017 |
| KR | 10-2017-0014924 A | 2/2017 |
| KR | 10-2017-0090261 A | 8/2017 |
| KR | 10-2017-0107798 A | 9/2017 |
| KR | 10-2018-0006150 A | 1/2018 |
| KR | 10-2018-0064298 A | 6/2018 |
| KR | 10-2019-0043252 A | 4/2019 |
| KR | 10-2019-0066731 A | 6/2019 |
| WO | WO 2013/031406 A1 | 3/2013 |
| WO | WO 2017/181282 A1 | 10/2017 |

OTHER PUBLICATIONS

International Search Report issued in PCT/KR2020/006862 (PCT/ISA/210), dated Sep. 16, 2020.

* cited by examiner

BATTERY MODULE INCLUDING BASE PLATE HAVING GAS DISCHARGE PASSAGE, AND BATTERY PACK AND ENERGY STORAGE SYSTEM INCLUDING THE SAME

CROSS-REFERENCE TO RELATED APPLICATIONS

The present application is a Continuation of application Ser. No. 17/294,562, filed on May 17, 2021, which is a National Phase of PCT International Application No. PCT/KR2020/006862, filed on May 27, 2020, which claims priority to Korean Patent Application No. 10-2019-0071733, filed on Jun. 17, 2019, in the Republic of Korea, the disclosures of which are expressly incorporated herein by reference.

TECHNICAL FIELD

The present disclosure relates to a battery module including a base plate having a gas discharge passage, and a battery pack and an energy storage system including the battery module, and more particularly, to a battery module that reduces the risk of secondary ignition or explosion and increases cooling efficiency.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery exterior, hermetically containing the electrode assembly together with an electrolyte.

In recent years, secondary batteries have been widely used not only in small-sized devices such as portable electronic devices but also in medium-sized or large-sized devices such as vehicles and power storage devices. When the secondary batteries are used in the middle-sized or large-sized devices, a large number of secondary batteries are electrically connected to increase capacity and power. In particular, secondary batteries are widely used for the middle-sized or large-sized devices since they may be easily stacked.

Meanwhile, recently, as the need for a large-capacity structure increases along with the utilization as an energy storage source, the demand for a plurality of secondary batteries connected in series and/or in parallel, a battery module accommodating the secondary batteries, and a battery pack having a battery management system (BMS) increases.

In addition, in order to protect a plurality of secondary batteries from external impacts or store the plurality of secondary batteries, the battery pack generally includes an outer housing made of metal. Meanwhile, the demand for a high-capacity battery pack has recently increased.

However, in the high-capacity battery pack, if any one secondary battery among the plurality of secondary batteries included in the battery module is ignited or exploded, heat or flame may be transferred to neighboring secondary batteries to cause secondary explosion or the like. Thus, efforts to increase stability are increasing.

Moreover, since the high-capacity battery pack generates more heat during charging and discharging compared to the existing technique, it is necessary to apply an effective cooling method. For example, as the cooling method, a method of discharging heat to the outside by circulating a cooled air in the plurality of secondary batteries has been used.

However, in the battery module using the air cooling method, when a specific secondary battery is ignited among the plurality of secondary batteries, the flame of the ignited secondary battery is transferred to neighboring secondary batteries more rapidly along the cooling wind, which makes it more difficult to secure stability.

Moreover, in the conventional battery module, the flame of the ignited secondary battery may also be propagated to neighboring secondary batteries through a gas passage formed to discharge the gas. Thus, it is required to develop a technique capable of preventing secondary ignition or explosion.

DISCLOSURE

Technical Problem

The present disclosure is designed to solve the problems of the related art, and therefore the present disclosure is directed to providing a battery module that reduces the risk of secondary ignition or explosion and increases cooling efficiency.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a cell assembly having a plurality of secondary batteries stacked on each other in a front and rear direction; and a base plate configured such that the plurality of secondary batteries of the cell assembly are mounted to an upper portion thereof, the base plate including at least one gas discharge passage having a sidewall elongated in the front and rear direction to communicate with the outside and an open portion formed by a top of the sidewall in one direction and at least one anti-inflammatory mesh sheet configured to cover the open portion.

Also, the base plate may include a cooling member located at one side of the gas discharge passage so that the cell assembly is mounted to an upper portion thereof, the cooling member having a coolant channel elongated in at least one direction to communicate with the outside, a coolant injection port for injecting a coolant and a coolant discharge port for discharging the coolant.

Moreover, the battery module may further comprise a thermally conductive pad interposed between the cooling member of the base plate and the plurality of secondary batteries.

In addition, the thermally conductive pad may have a plurality of insert grooves formed at locations corresponding to the plurality of secondary batteries so that the plurality of secondary batteries are partially inserted into a respective one of the plurality of insert grooves.

Further, the battery module may further comprise an upper cover having a top portion extending in a horizontal direction to cover an upper portion of the cell assembly and side portions coupled to the base plate and extending downward from a left end and a right end of the top portion to cover a left side and a right side of the cell assembly; a bus bar assembly having a bus bar electrically connected to the cell assembly and a bus bar frame coupled to the side portion so that the bus bar is mounted thereto; a front cover coupled to a front end of the upper cover to cover a front side of the cell assembly; and a rear cover coupled to a rear end of the upper cover to cover a rear side of the cell assembly.

Also, the rear cover may have open holes through which the coolant injection port and the coolant discharge port of the cooling member are exposed to the outside, respectively, and the rear cover may have a gas exhaust hole opened to communicate with the gas discharge passage.

Moreover, the rear cover may include a mesh member inserted into the gas exhaust hole.

In addition, the cell assembly may include an anti-inflammatory sheet interposed between the plurality of secondary batteries.

In another aspect of the present disclosure, there is also provided a battery pack, comprising at least one battery module according to the present disclosure.

In further another aspect of the present disclosure, there is also provided an energy storage system, comprising the battery pack according to the present disclosure.

Advantageous Effects

According to an embodiment of the present disclosure, since the battery module of the present disclosure includes the base plate that has at least one anti-inflammatory mesh sheet configured to cover the open portion of the gas discharge passage, it is possible to prevent flame from being transferred from a secondary battery where a fire or explosion occurs among the plurality of secondary batteries to other neighboring secondary batteries through the gas discharge passage. Thus, the safety of the battery module may be increased.

Also, according to an embodiment of the present disclosure, since the battery module of the present disclosure adopts an indirect cooling method using a coolant (liquid) rather than an air cooling method, it is possible to solve the problem of the air cooling structure in which ignition propagation is promoted due to circulation of air when ignition occurs at the secondary battery. Accordingly, the risk of fire of the battery module 200 may be effectively reduced.

In addition, according to an embodiment of the present disclosure, since the rear cover includes the mesh member inserted into the gas exhaust hole, when a fire or explosion occurs at the cell assembly inside the battery module, it is possible to prevent the flame from being blown out through the gas exhaust hole. Accordingly, it is possible to prevent the fire from spreading to objects adjacent to the battery module, thereby increasing the safety of the battery module in use.

Further, according to an embodiment of the present disclosure, since the cell assembly includes the anti-inflammatory sheet interposed between the plurality of secondary batteries, even though a fire or explosion occurs at any one of the plurality of secondary batteries, the effect of the flame to neighboring secondary batteries may be reduced by the anti-inflammatory sheet, thereby preventing a secondary explosion or fire from spreading. Accordingly, the safety of the battery module may be effectively increased.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
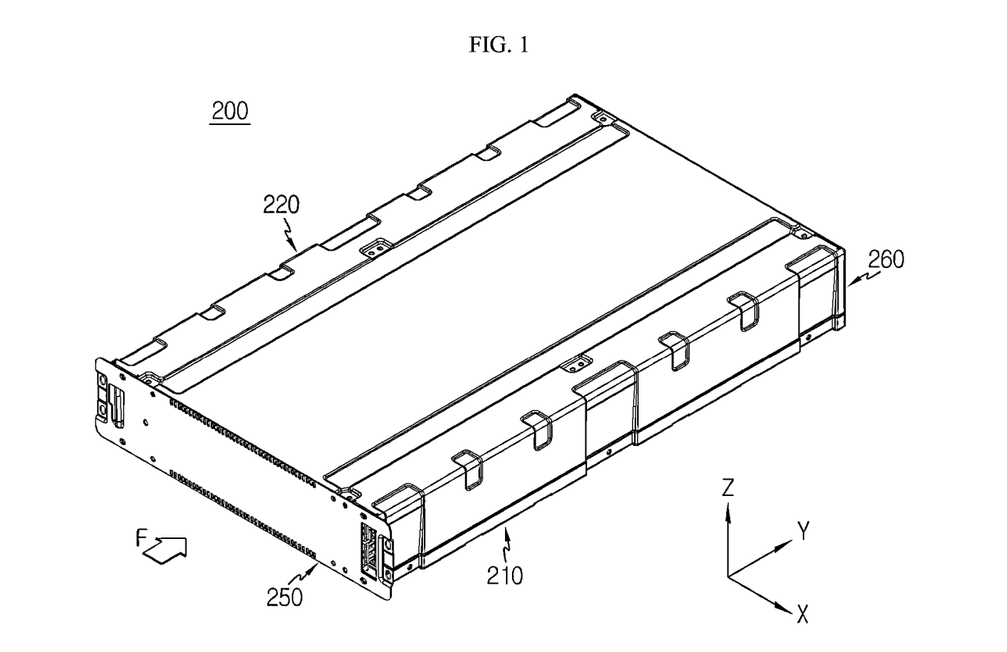
FIG. 1 is a perspective view schematically showing a battery module according to an embodiment of the present disclosure.

FIG. 1 is a perspective view schematically showing a battery module according to an embodiment of the present disclosure. Also, FIG. 2 is an exploded perspective view schematically showing components of the battery module according to an embodiment of the present disclosure.

Figure 2:
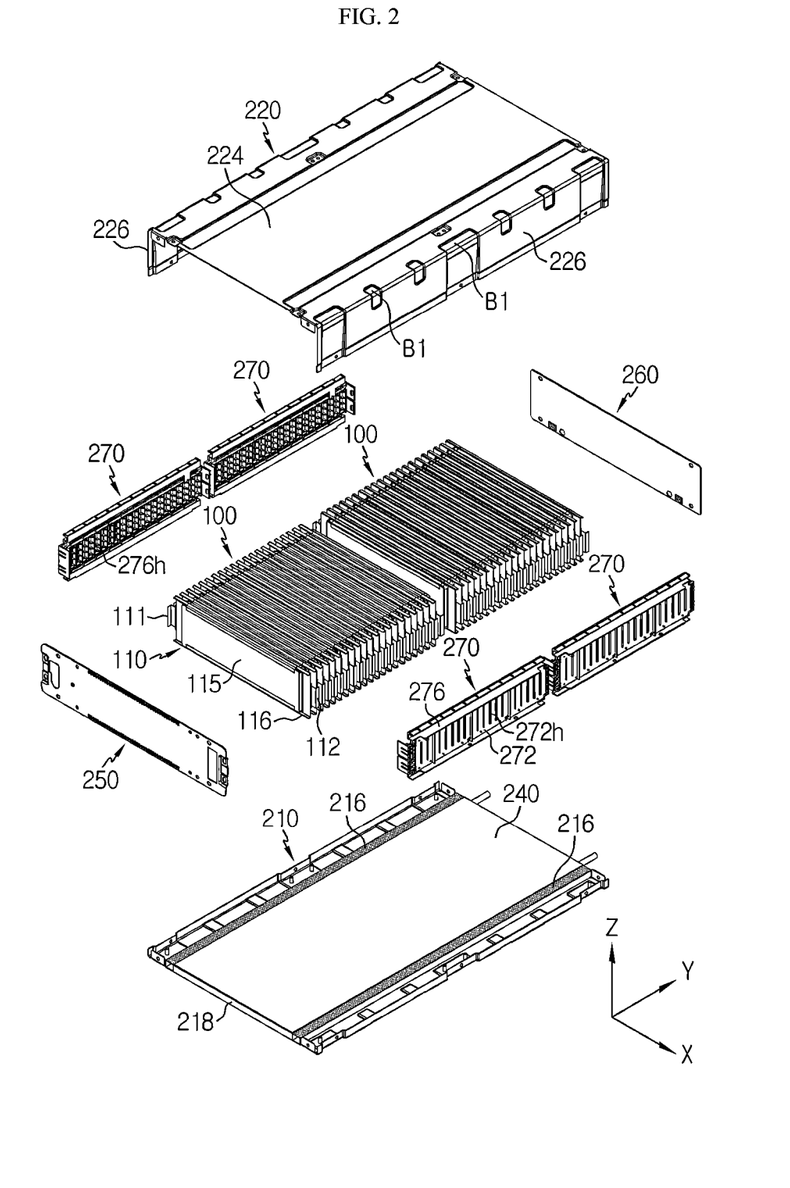
FIG. 2 is an exploded perspective view schematically showing components of the battery module according to an embodiment of the present disclosure.

Referring to FIGS. 1 and 2, a battery module 200 according to an embodiment of the present disclosure includes at least one cell assembly 100 having a plurality of secondary batteries 110, and a base plate 210.

Specifically, the cell assembly 100 may include a plurality of secondary batteries 110 stacked on each other in a front and rear direction. The secondary battery 110 may be a pouch-type secondary battery 110. For example, as shown in FIG. 2, each of the two cell assemblies 100 may be configured such that 21 pouch-type secondary batteries 110 are stacked side by side in the front and rear direction (Y direction).

In particular, the pouch-type secondary battery 110 may include an electrode assembly (not shown), an electrolyte (not shown), and a pouch 116.

When viewed in an F direction (shown in FIG. 1), each of the secondary batteries 110 may be arranged to be erect perpendicular to the ground (Z direction) so that two wide surfaces are located at the front and rear sides, respectively, and sealing portions are located at upper, lower, left and right sides. In other words, each secondary battery 110 may be configured to be vertically erected. Meanwhile, in this specification, unless otherwise specified, the upper, lower, front, rear, left and right directions will be set based on the case where viewed in the F direction.

Here, the terms indicating directions such as front, rear, left, right, upper and lower, used in this specification, may vary depending on the position of an observer or the shape of an object. However, in this specification, for convenience of description, the front, rear, left, right, upper and lower directions are distinguished based on the case where viewed in the F direction.

Here, the pouch 116 may be configured to have an accommodation portion 115 formed in a concave shape. In addition, the electrode assembly and the electrolyte may be accommodated in the accommodation portion 115. In addition, each pouch 116 includes an outer insulating layer, a metal layer and an inner adhesive layer, and the inner adhesive layers of the pouch are adhered to each other at an edge of the pouch 116 to form a sealing portion. Moreover, a terrace portion may be formed at each end in the left and right direction (X direction) at which a positive electrode lead 111 and a negative electrode lead 112 of the pouch 116 are formed.

In addition, the electrode assembly is an assembly of an electrode plate coated with an electrode active material and a separator, and at least one positive electrode plate and at least one negative electrode plate may be arranged with a separator being interposed therebetween. In addition, a positive electrode tab is provided to the positive electrode plate of the electrode assembly, and at least one positive electrode tab may be connected to the positive electrode lead 111.

Here, one end of the positive electrode lead 111 may be connected to the positive electrode tab, the other end thereof may be exposed out of the pouch 116, and the exposed portion may function as an electrode terminal of the secondary battery 110, for example a positive electrode terminal of the secondary battery 110.

In addition, a negative electrode tab is provided to the negative electrode plate of the electrode assembly, and at least one negative electrode tab may be connected to the negative electrode lead 112. In addition, one end of the negative electrode lead 112 may be connected to the negative electrode tab, the other end thereof may be exposed out of the pouch, and the exposed portion may function as an electrode terminal of the secondary battery 110, for example a negative electrode terminal of the secondary battery 110.

Moreover, as shown in FIG. 1, when viewed directly in the F direction, the positive electrode lead 111 and the negative electrode lead 112 may be formed at left and right ends in opposite directions (X direction) with respect to the center of the secondary battery 110. That is, the positive electrode lead 111 may be provided at one end (left end) based on the center of the secondary battery 110. In addition, the negative electrode lead 112 may be provided at the other end (right end) based on the center of the secondary battery 110.

For example, as shown in FIG. 2, each secondary battery 110 of the cell assembly 100 may be configured such that the positive electrode lead 111 and the negative electrode lead 112 protrude in the left and right direction.

Therefore, according to this configuration of the present disclosure, in one secondary battery 110, there is no interference between the positive electrode lead 111 and the negative electrode lead 112, and thus the area of the electrode leads may be increased.

In addition, the positive electrode lead 111 and the negative electrode lead 112 may be configured in a plate form. In particular, the positive electrode lead 111 and the negative electrode lead 112 may protrude in a horizontal direction (X direction) in a state where their wide surfaces are erect to face in the front and rear direction.

Here, the horizontal direction may refer to a direction parallel to the ground when the secondary battery 110 is placed on the ground, and may also be referred to as at least one direction on a plane perpendicular to the upper and lower direction.

However, the battery module 200 according to the present disclosure is not limited to the pouch-type secondary battery 110 described above, and various kinds of secondary batteries 110 known at the time of filing of this application may be employed.

Figure 3:
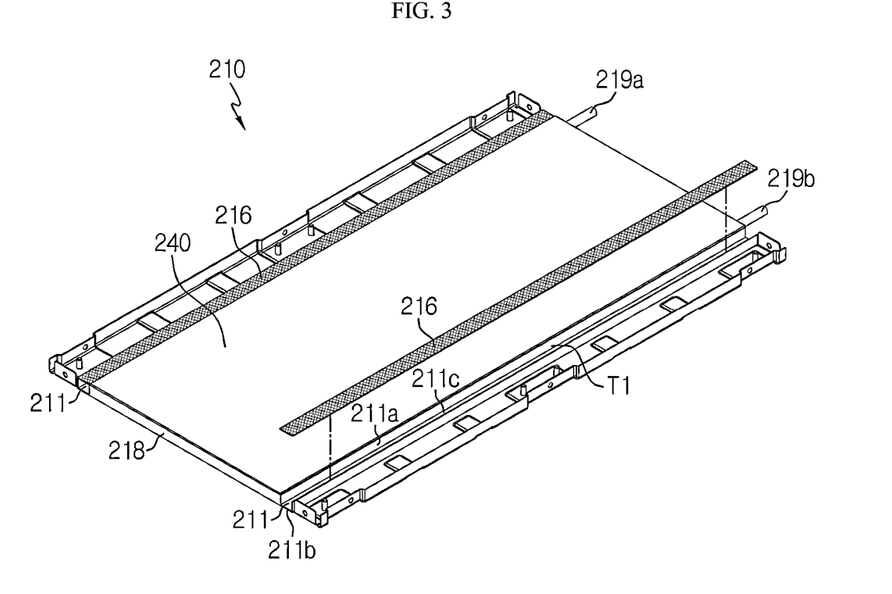
FIG. 3 is a perspective view schematically showing a base plate, employed at the battery module according to another embodiment of the present disclosure.

FIG. 3 is a perspective view schematically showing a base plate, employed at the battery module according to another embodiment of the present disclosure.

Referring to FIG. 3 along with FIGS. 1 and 2, the base plate 210 may include at least one gas discharge passage 211 and an anti-inflammatory mesh sheet 216.

Specifically, the gas discharge passage 211 may include a sidewall elongated in the front and rear direction to communicate with the outside. For example, as shown in FIG. 3, the gas discharge passage 211 may include a left sidewall 211a, a right sidewall 211b, and a lower sidewall 211c. In addition, an open portion T1 formed by opening a portion of the sidewall of the gas discharge passage 211 in one direction may be provided. The open portion T1 may be, for example, as shown in FIG. 3, formed by opening an upper portion of the gas discharge passage 211.

For example, as shown in FIGS. 2 and 3, the base plate 210 may include two gas discharge passages 211 located at both left and right sides thereof. At this time, the two gas discharge passages 211 may be extended from a front end to a rear end of the base plate 210.

In addition, the anti-inflammatory mesh sheet 216 may be configured to cover the open portion T1. The anti-inflammatory mesh sheet 216 may be configured to be inserted into an open hole of the open portion T1 or to cover an upper portion of the open portion T1 so as to entirely cover the open portion T1 of the gas discharge passage 211.

Here, the anti-inflammatory mesh sheet 216 may include a nonflammable material that is difficult to burn. For example, the nonflammable material may be chlorine-containing vinyl chloride resin, paraffin chloride, decabromodiphenyl oxide, antimony trioxide, and the like. The anti-inflammatory mesh sheet 216 may be prepared by coating a raw fabric obtained by weaving multifilament fibers such as polyester, nylon and polypropylene with a flame-retardant vinyl chloride paste resin composition, then processing and heat-treating the fabric, and then processing the same into a mesh form.

The anti-inflammatory mesh sheet 216 may be configured to allow gas discharged from the cell assembly 100 to pass but not to allow flame to pass. That is, the anti-inflammatory mesh sheet 216 may serve to block the generated flame from being transferred to neighboring secondary batteries.

For example, the anti-inflammatory mesh sheet 216 may have so dense mesh to allow gas to pass therethrough but not to allow flame to pass. The anti-inflammatory mesh sheet 216 may have a mesh size of 0.1 mm×0.1 mm to 5 mm×5 mm, more preferably 1 mm×1 mm to 2 mm×2 mm.

Thus, according to this configuration of the present disclosure, since the battery module 200 of the present disclosure includes the base plate that has at least one anti-inflammatory mesh sheet 216 configured to cover the open portion T1 of the gas discharge passage 211, it is possible to prevent flame from being transferred from a secondary battery where a fire or explosion occurs among the plurality of secondary batteries to other neighboring secondary batteries through the gas discharge passage. Thus, the safety of the battery module may be increased.

In addition, the base plate 210 may include a cooling member 218. Specifically, the cell assembly 100 may be mounted to an upper portion of the cooling member 218. For example, as shown in FIGS. 2 and 3, 42 secondary batteries 110 may be mounted to the cooling member 218. In addition, the cooling member 218 may be a heatsink having an exterior made of a material with high thermal conductivity. That is, the cooling member 218 may be configured to absorb heat generated in the cell assembly 100 mounted to the upper portion thereof through the exterior in a conductive manner.

A coolant channel (not shown) configured to allow a coolant to move therethrough may be provided inside the cooling member 218. In addition, the cooling channel may have a plurality of straight portions (not shown) elongated in the front and rear direction and a curved portion (not shown) connecting the plurality of straight portions. However, the coolant channel is not limited to a specific shape, and the shape and location may be appropriately designed and changed in consideration of the heat distribution of the cell assembly. In addition, a coolant injection port 219a and a coolant discharge port 219b may be provided at both ends of the coolant channel.

For example, as shown in FIGS. 2 and 3, the base plate 210 may include a cooling member 218 provided between two gas discharge passages 211 located at both left and right sides thereof. In this case, the coolant injection port 219a and the coolant discharge port 219b may be provided at a rear end of the cooling member 128.

Thus, according to this configuration of the present disclosure, since the battery module 200 of the present disclosure adopts an indirect cooling method using a coolant (liquid) rather than an air cooling method, it is possible to solve the problem of the air cooling structure in which ignition propagation is promoted due to circulation of air (cooling wind) when ignition occurs at the secondary battery. Accordingly, the risk of fire of the battery module 200 may be effectively reduced.

Moreover, the battery module 200 may include a thermally conductive pad 240 interposed between the cooling member 218 of the base plate 210 and the plurality of secondary batteries 110. The thermally conductive pad 240 may include a polymer resin or a silicone resin with high thermal conductivity. For example, the polymer resin may be a polysiloxane resin or an epoxy-based resin.

For example, as shown in FIG. 2, the thermally conductive pad 240 may be located on the entire upper surface of the cooling member 218 and coated in a predetermined thickness.

Thus, according to this configuration of the present disclosure, since the cooling member 218 includes the thermally conductive pad 240, the heat generated in the cell assembly 100 may be effectively transferred to the cooling member 218.

Figure 4:
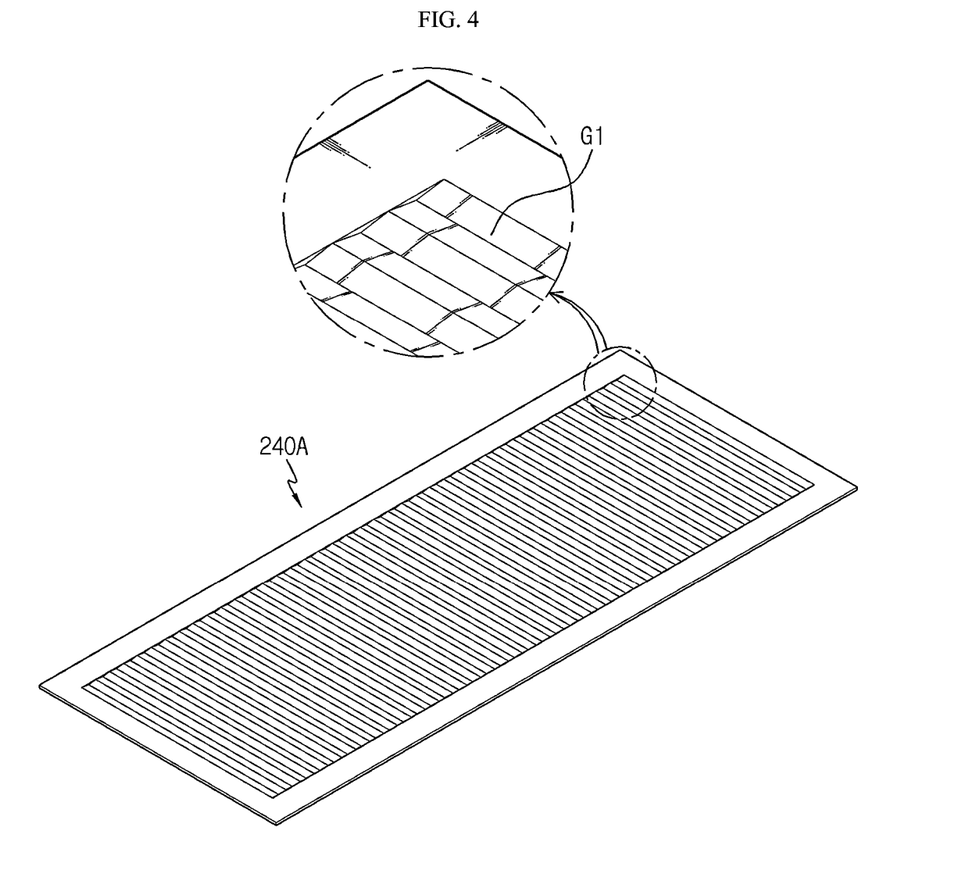
FIG. 4 is a plan view schematically showing a thermally conductive pad, employed at the battery module according to another embodiment of the present disclosure.

FIG. 4 is a plan view schematically showing a thermally conductive pad, employed at the battery module according to another embodiment of the present disclosure.

Referring to FIG. 4 along with FIG. 3, the thermally conductive pad 240A according to another embodiment may have an insert groove G1 so that a portion of each of the plurality of secondary batteries 110 is inserted therein. The insert groove G1 may have a form indented inward so that a portion of the sealing portion of the plurality of secondary batteries 110 is inserted therein. The insert groove G1 may be formed at a location corresponding to each of the plurality of secondary batteries 110. For example, as shown in FIG. 4, 42 insert grooves G1 may be formed so that the sealing portions of the 24 secondary batteries 110 are partially inserted therein.

Thus, according to this configuration of the present disclosure, since the thermally conductive pad 240A has the insert groove G1 so that a portion of each of the plurality of secondary batteries 110 is inserted therein, a contact area between the thermally conductive pad 240A and the plurality of secondary batteries 110 is increased, thereby effectively absorbing the heat generated in the cell assembly 100. In addition, the insert groove G1 may serve as a guide for guiding each of the plurality of secondary batteries 110 stacked in one direction to be disposed in a regular location.

Referring to FIGS. 1 and 2 again, the battery module 200 according to an embodiment of the present disclosure may include an upper cover 220, a bus bar assembly 270, a front cover 250, and a rear cover 260.

Specifically, the upper cover 220 may include a top portion 224 and side portions 226. The top portion 224 may have a plate shape extending in a horizontal direction to cover the upper portion of the cell assembly 100. The side portions 226 may have a plate shape extending downward from both left and right ends of the top portion 224 to cover both left and right side portions of the cell assembly 100.

In addition, the side portion 226 may be coupled to a portion of the base plate 210. For example, as shown in FIG. 2, the upper cover 220 may have a top portion 224 with a plate shape extending in the front, rear, left and right directions. The upper cover 220 may have two side portions 226 extending downward from both left and right ends of the top portion 224. Further, lower ends of the two side portions 226 may be respectively coupled to both left and right ends of the base plate 210. At this time, the coupling method may be male-female engagement or welding.

Moreover, the side portion 226 may have a beading portion B1 raised upward toward the secondary battery. For example, as shown in FIG. 2, seven beading portions B1 raised inward toward the cell assembly 100 may be formed at one side portion 226.

Thus, according to this configuration of the present disclosure, since the base plate 210 has a structure capable of stably protecting the plurality of secondary batteries 110 from external impacts, it is possible to increase the safety of the battery module 200 against external impacts.

The bus bar assembly 270 may include bus bars 272 and bus bar frames 276 located at both left and right sides of the cell assembly 100.

Specifically, the bus bar 272 may include a conductive metal, for example copper, aluminum, nickel, or the like. The bus bar 272 may be configured to electrically connect the plurality of secondary batteries 110 of the cell assembly 100 to each other. The bus bar 272 may have a slit 272h opened such that the electrode lead of each of the plurality of secondary batteries 110 is inserted therein. For example, as shown in FIG. 2, the bus bar 272 may be connected to the negative electrode lead 112 of the secondary battery 110 and the positive electrode lead 111 of another secondary battery 110 inserted in a plurality of slits, respectively.

Moreover, the bus bar frame 276 may be configured so that a plurality of bus bars 272 are mounted thereto. An opened communication portion 276h may be formed in the bus bar frame 276 so that the plurality of secondary batteries 110 communicate with the bus bar 272. Thus, the bus bar 272 may come into contact with the positive electrode lead 111 or the negative electrode lead 112 of the plurality of secondary batteries 110 through the communication portion 276h of the bus bar frame 276. The bus bar frame 276 may be made of an electrically insulating material. For example, the bus bar frame 276 may include a plastic material. More specifically, the plastic material may be polyvinyl chloride.

Moreover, the front cover 250 may be configured to cover the front side of the plurality of secondary batteries 110. For example, the front cover 250 may have a plate shape with a size larger than that of the front surface of the plurality of secondary batteries 110. The plate shape may be erected in the vertical direction.

Further, a portion of an outer circumference of the front cover 250 may be coupled to the base plate 210. For example, a lower portion of the outer circumference of the front cover 250 may be coupled to a front end of the base plate 210. Further, an upper portion of the outer circumference of the front cover 250 may be coupled to a front end of the upper cover 220. Here, bolting may be applied for the coupling.

In addition, the rear cover 260 may be configured to cover a rear side of the cell assembly 100. For example, the rear cover 260 may have a plate shape with a size larger than that of the rear surface of the plurality of secondary batteries 110.

Also, a portion of an outer circumference of the rear cover 260 may be coupled to the base plate 210. For example, a lower portion of the outer circumference of the rear cover 260 may be coupled to a front end of the base plate 210. Further, an upper portion of the outer circumference of the rear cover 260 may be coupled to a rear end of the upper cover 220. Here, bolting may be applied for the coupling.

Figure 5:
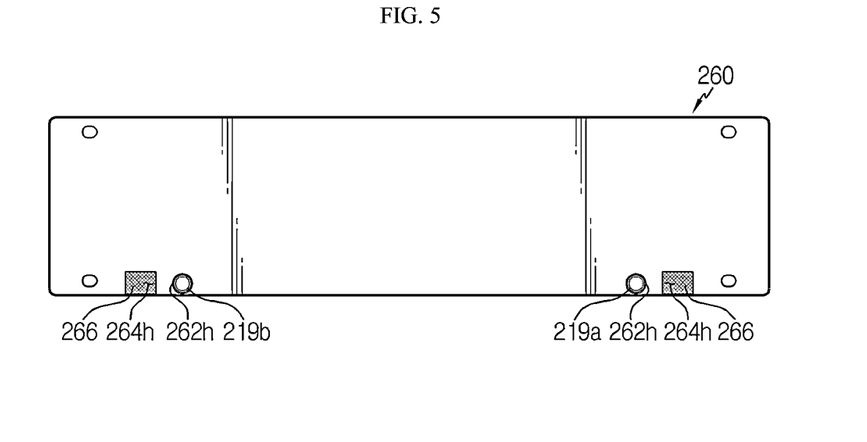
FIG. 5 is a rear view schematically showing the battery module according to an embodiment of the present disclosure.

FIG. 5 is a rear view schematically showing the battery module according to an embodiment of the present disclosure.

Referring to FIG. 5 along with FIGS. 2 and 3, the rear cover 260 may have an open hole 262h that is opened so that the coolant injection port 219a and the coolant discharge port 219b of the cooling member 218 are respectively exposed to the outside therethrough. The open hole 262h may have a size corresponding to the cross section of the open hole 262h or more so that the coolant injection port 219a and the coolant discharge port 219b may be exposed, respectively.

In addition, the coolant injection port 219a and the coolant discharge port 219b may be respectively inserted into two open holes 262h to protrude to the outside. Thus, the coolant injection port 219a and the coolant discharge port 219b exposed through the open holes 262h may be easily connected to an external device that injects and retrieves a coolant.

Also, the rear cover 260 may have a gas exhaust hole 264h opened to communicate with the gas discharge passage 211. A rearmost end of the gas discharge passage 211 may be connected to the gas exhaust hole 264h. Thus, gas moving through the gas discharge passage 211 may be discharged to the outside through the gas exhaust hole 264h.

Thus, according to this configuration of the present disclosure, since gas moving in the gas discharge passage is discharged to the outside through the open portion of the rear cover, the electronic device located at the front side of the battery module or the bus bar assembly located at the left and right sides thereof may avoid the influence of the generated gas, thereby preventing secondary accidents or malfunctions such as disconnection or short circuit in advance.

Moreover, the rear cover 260 may include a mesh member 266 inserted into the gas exhaust hole 264h. The mesh member 266 may have a size corresponding to or larger than the cross-sectional area of the gas exhaust hole 264h. The mesh member 266 may be configured to cover the gas exhaust hole 264h as a whole. The mesh member 266 may be configured to allow the gas discharged from the cell assembly 100 to pass but not to allow flame to pass. That is, the mesh member 266 may serve to block internal flames from being transferred to the outside.

For example, the mesh member 266 may have so dense mesh to allow gas to pass therethrough but not to allow flame to pass. The mesh member 266 may have a mesh size of 0.1 mm×0.1 mm to 5 mm×5 mm, more preferably 1 mm×1 mm to 2 mm×2 mm.

Here, the mesh member 266 may include a nonflammable material that is difficult to burn. For example, the nonflammable material may be chlorine-containing vinyl chloride resin, paraffin chloride, decabromodiphenyl oxide, antimony trioxide, and the like. The mesh member 266 may be prepared by coating a raw fabric obtained by weaving multifilament fibers such as polyester, nylon and polypropylene with a flame-retardant vinyl chloride paste resin composition, then processing and heat-treating the fabric, and then processing the same into a mesh form.

For example, as shown in FIG. 5, the rear cover 260 may have two gas exhaust holes 264h. A mesh member 266 may be inserted into each of the two gas exhaust holes 264h.

Thus, according to this configuration of the present disclosure, since the rear cover 260 includes the mesh member 266 inserted into the gas exhaust hole 264h, when a fire or explosion occurs at the cell assembly 100 inside the battery module 200, it is possible to prevent the flame from being blown out through the gas exhaust hole 264h. Accordingly, it is possible to prevent the fire from spreading to objects adjacent to the battery module 200, thereby increasing the safety of the battery module 200 in use.

Figure 6:
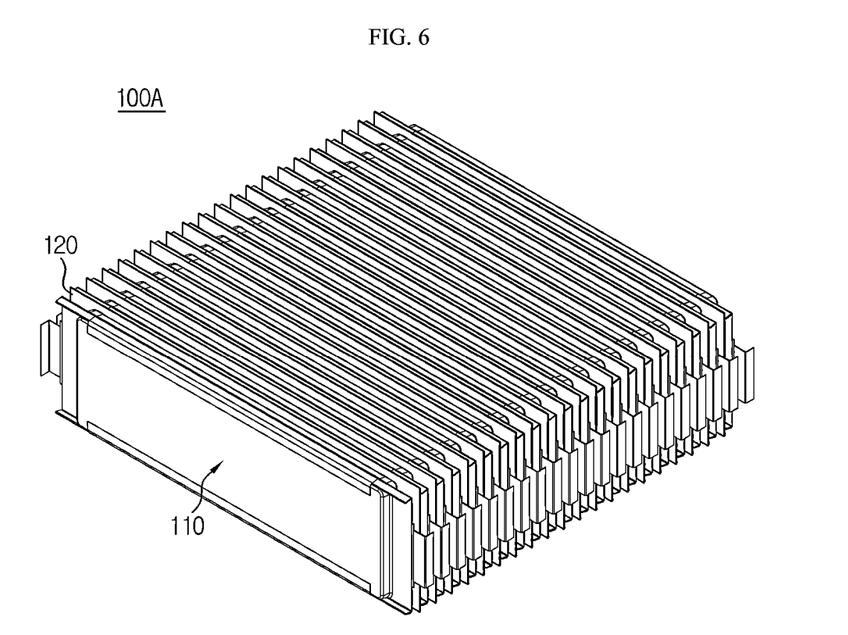
FIG. 6 is a perspective view schematically showing a cell assembly, employed at the battery module according to another embodiment of the present disclosure.

FIG. 6 is a perspective view schematically showing a cell assembly, employed at the battery module according to another embodiment of the present disclosure.

Referring to FIG. 6, the cell assembly 100A according to an embodiment of the present disclosure may include an anti-inflammatory sheet 120 interposed between the plurality of secondary batteries 110. The anti-inflammatory sheet 120 may have a size equal to or greater than the surface of the plurality of secondary batteries 110 facing each other. For example, as shown in FIG. 6, 20 anti-inflammatory sheets 120 may be interposed between 21 secondary batteries 110. At this time, the anti-inflammatory sheet 120 may have a size smaller than or equal to the area of the secondary battery 110 in the front and rear direction. That is, it is appropriate that the anti-inflammatory sheet 120 is formed so as not to protrude out of the sealing portions formed at the left and right sides.

For example, the anti-inflammatory sheet 120 may have so dense mesh to allow gas to pass therethrough but not to allow flame to pass. The anti-inflammatory sheet 120 may have a mesh size of 0.1 mm×0.1 mm to 5 mm×5 mm, more preferably 1 mm×1 mm to 2 mm×2 mm.

Here, the anti-inflammatory sheet 120 may include a nonflammable material that is difficult to burn. For example, the nonflammable material may be chlorine-containing vinyl chloride resin, paraffin chloride, decabromodiphenyl oxide, antimony trioxide, and the like. The anti-inflammatory sheet 120 may be prepared by coating a raw fabric obtained by weaving multifilament fibers such as polyester, nylon and polypropylene with a flame-retardant vinyl chloride paste resin composition, then processing and heat-treating the fabric, and then processing the same into a mesh form.

Therefore, according to this configuration of the present disclosure, since the cell assembly 100 includes the anti-inflammatory sheet 120 interposed between the plurality of secondary batteries 110, even though a fire or explosion occurs at any one of the plurality of secondary batteries 110, the effect of the flame to neighboring secondary batteries 110 may be reduced by the anti-inflammatory sheet 120, thereby preventing a secondary explosion or fire from spreading. Accordingly, the safety of the battery module may be effectively increased.

Meanwhile, a battery pack (not shown) according to an embodiment of the present disclosure includes at least one battery module 200. In addition, the battery pack may further include various devices (not shown) for controlling charging and discharging of the plurality of secondary batteries 110, for example, a battery management system (BMS), a current sensor, and a fuse.

In addition, an energy storage system according to an embodiment of the present disclosure includes the battery pack. The energy storage system may further include a control unit having a switch capable of controlling on/off operation of the battery pack.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery module | 100: cell assembly |
| 110: secondary battery | 210: base plate |

| Reference Signs | |
|---|---|
| 211: gas discharge passage | 216: anti-inflammatory mesh sheet |
| 218: cooling member | 219a, 219b: coolant injection port, coolant discharge port |
| 240: thermally conductive pad | |
| 220: upper cover | G1: insert groove |
| 250: front cover | 224, 226: top portion, side portion |
| 262h: open hole | 260: rear cover |
| 266: mesh member | 264h: gas exhaust hole |
| 270: bus bar assembly | 120: anti-inflammatory sheet |
| | 272, 276: bus bar, bus bar frame |

INDUSTRIAL APPLICABILITY

The present disclosure relates to a battery module including an inner cover. In addition, the present disclosure is available for industries associated with a battery pack including at least one battery module and a vehicle including the battery pack.

What is claimed is:

1. A battery module, comprising:
   a base plate;
   a front cover at a first end of the base plate and a rear cover at a second end of the base plate, the rear cover spaced from the front cover in a first direction;
   a pair of gas discharge passages in the base plate extending in the first direction;
   an outlet in the rear cover for each of the pair of gas discharge passages; and
   a mesh cover over each outlet,
   wherein each of the pair of gas discharge passages has an open portion formed by a top of the gas discharge passage.

2. The battery module of claim 1, further comprising a cell assembly having a plurality of secondary batteries stacked in the first direction.

3. The battery module of claim 1, further comprising a mesh sheet covering each of the pair of gas discharge passages.

4. The battery module of claim 1, further comprising a central portion of the base plate formed between the pair of gas discharge passages.

5. The battery module of claim 4, further comprising a coolant member in the central part of the base plate.

6. The battery module of claim 5, wherein the coolant member has a coolant injection port and a coolant discharge port extending from the rear cover.

7. The battery module of claim 4, further comprising a thermally conductive pad on the central portion.

8. The battery module of claim 7, wherein a top surface of the thermally conductive pad has a plurality of insert grooves.

9. The battery module of claim 1, wherein each of the pair of gas discharge passages has a bottom wall and a pair of sidewalls.

10. A battery pack, comprising at least one battery module as defined in claim 1.

11. An energy storage system, comprising the battery pack as defined in claim 10.

* * * * *